C. C. THOMAS.
PROCESS AND APPARATUS FOR SPRAYING LIQUIDS AND TREATING GASES.
APPLICATION FILED MAY 3, 1915.
1,246,355.
Patented Nov. 13, 1917.
5 SHEETS—SHEET 1.
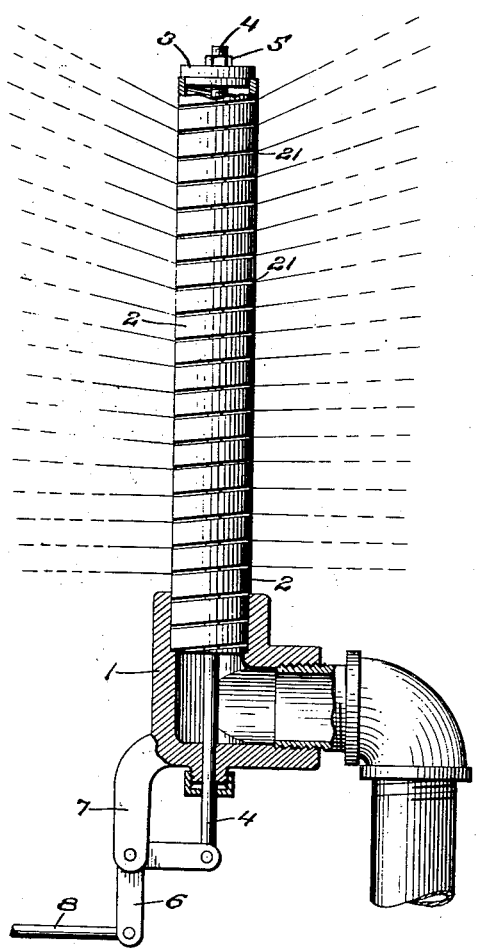
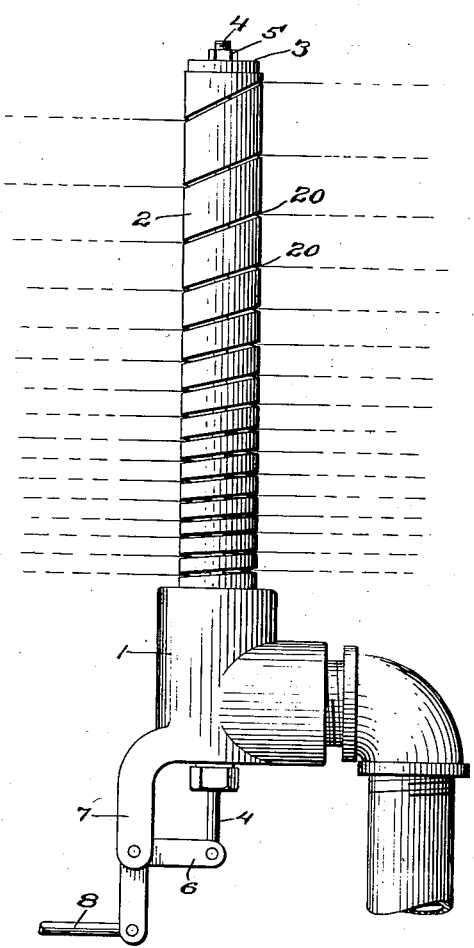
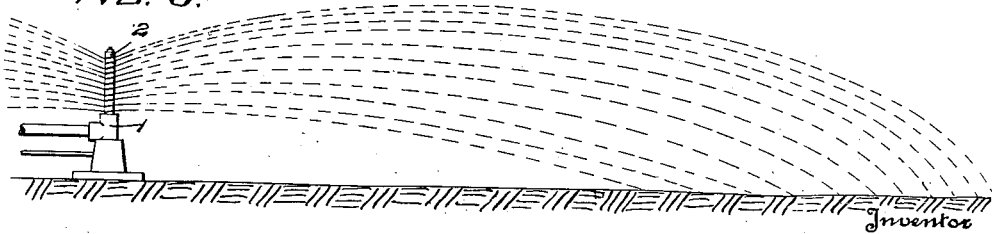
Witnesses
A. M. Liogner
M. A. McDaniel.
Inventor
Carl C. Thomas.
By F. E. Barrows,
Attorney

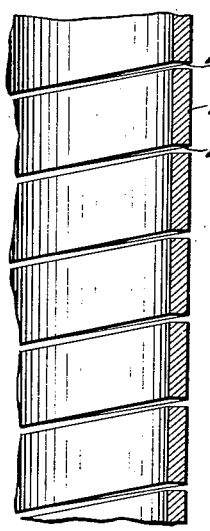
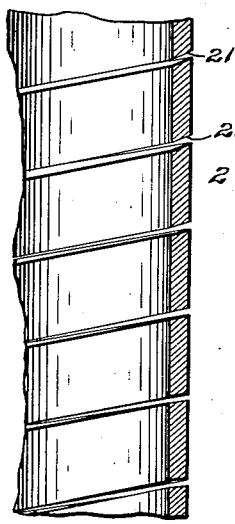
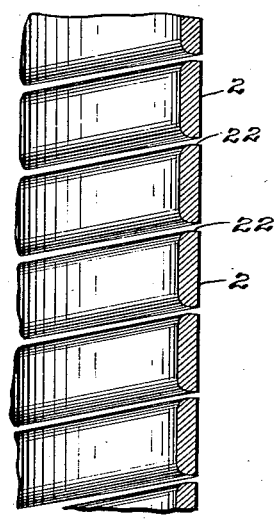
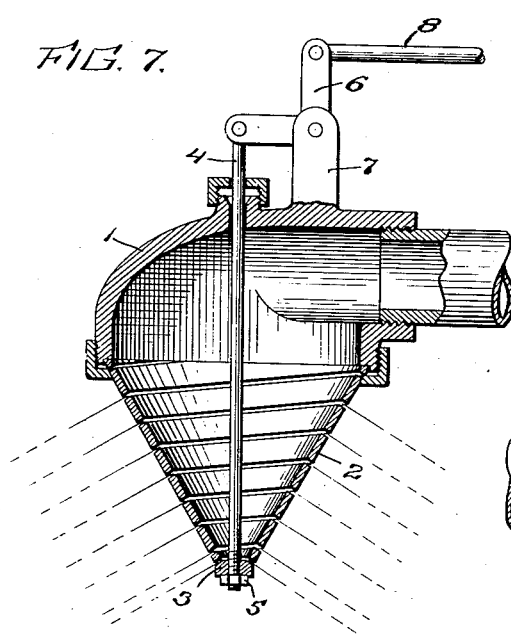
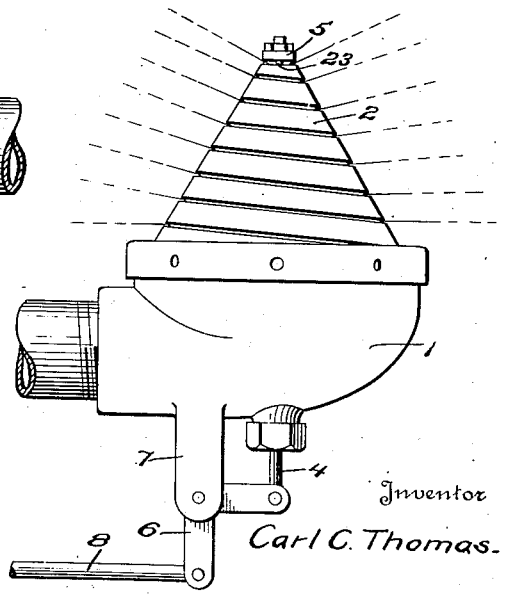

C. C. THOMAS.
PROCESS AND APPARATUS FOR SPRAYING LIQUIDS AND TREATING GASES.
APPLICATION FILED MAY 3, 1915.
1,246,355.
Patented Nov. 13, 1917.
5 SHEETS—SHEET 3.
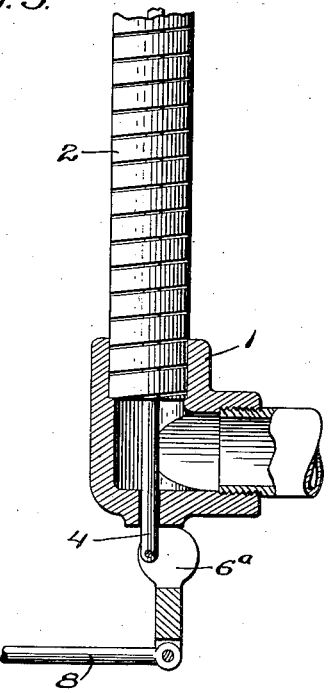
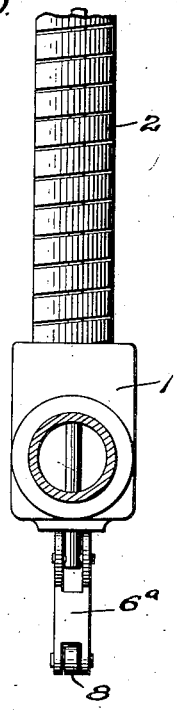
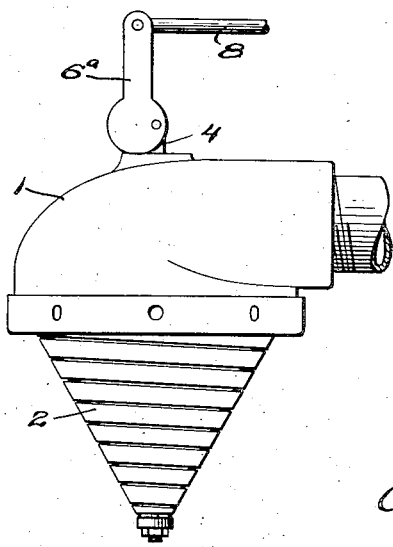
Witnesses
A. M. Fogner.
M. A. McDaniel.
Inventor
Carl C. Thomas.
By F. E. Barrows
Attorney C. C. THOMAS.
PROCESS AND APPARATUS FOR SPRAYING LIQUIDS AND TREATING GASES.
APPLICATION FILED MAY 3, 1915.

1,246,355.

Patented Nov. 13, 1917.

Inventor
Carl C. Thomas.
By F. E. Barrows
Attorney

Witnesses

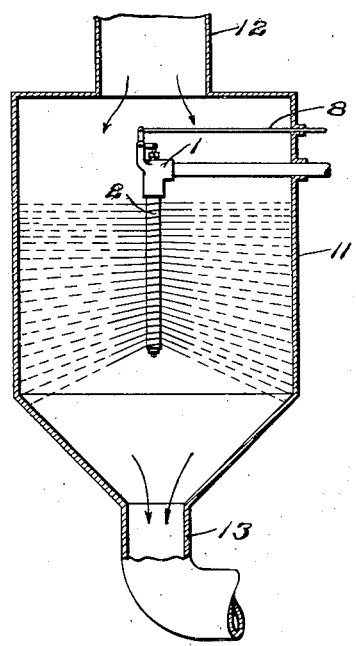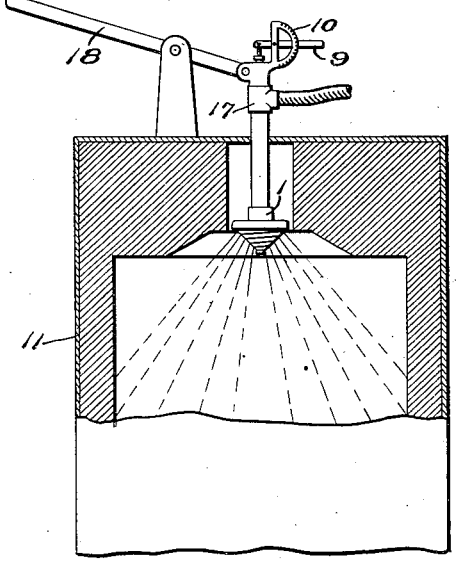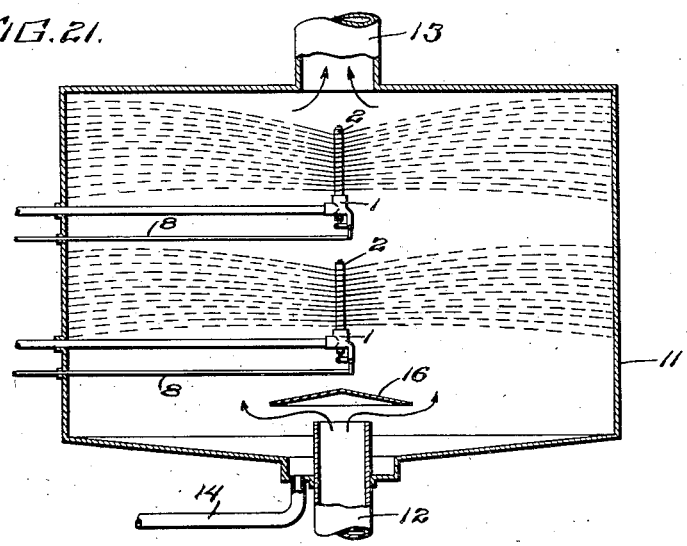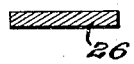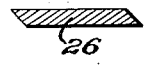

UNITED STATES PATENT OFFICE.

CARL C. THOMAS, OF BALTIMORE, MARYLAND.

PROCESS AND APPARATUS FOR SPRAYING LIQUIDS AND TREATING GASES.

1,246,355.      Specification of Letters Patent.      Patented Nov. 13, 1917.

Application filed May 3, 1915. Serial No. 25,658.

*To all whom it may concern:*

Be it known that I, CARL C. THOMAS, a citizen of the United States, residing at Baltimore, in the county of Baltimore City and State of Maryland, have invented certain new and useful Improvements in Processes and Apparatus for Spraying Liquids and Treating Gases, of which the following is a specification.

My invention relates to a process and apparatus for spraying liquids and treating gases.

In the spraying of liquids such as water for such purposes as watering lawns or extinguishing fires, or for ornamental purposes in fountains, etc., it is frequently desirable to obtain a wide and uniform distribution of the liquid and as fine a breaking up of the liquid as possible. In the spraying of liquids for treating gases as in gas washers or scrubbers, or in air moisteners or humidifiers, or in steam condensers and absorption towers, or in carbureting apparatus, etc., it is similarly desirable to obtain a most intimate intermingling of the liquid and gas, and a fine breaking up of the liquid in the form of spray. The novel process and apparatus of the present invention are particularly advantageous for such purposes. The novel spray head of the present invention enables a most intimate and uniform breaking up and distribution of the liquid to be effected; and it moreover enables the spray to be regulated in a particularly valuable and advantageous manner. The spray head of the present invention is moreover readily flushable when desired so that in case of clogging, the interruption of the spray head operation for purposes of cleaning or flushing need be but momentary. When used in the treatment of gases in combination with a suitable gas treating chamber, this spray head enables a most intimate and uniform breaking up and distribution of the liquid to be effected, and a most advantageous and thorough washing or scrubbing or moistening of the gas to be obtained. Such gas treating apparatus may be of many different forms and types, and may be used for many different purposes, such as the moistening or humidifying or conditioning of air, the condensing of steam, or the absorption of gases or vapors in absorption apparatus, the purifying of smoke or fumes or air or gases laden with dust such as cement dust, etc., the carbureting of gases, the scrubbing or washing of gas of various kinds such as illuminating gas or power gas, etc.

I will now proceed to describe my invention more in detail with particular reference to certain embodiments thereof illustrated on the accompanying drawing, it being intended and understood that the invention will be illustrated by, but is not limited to, the specific embodiments thereof so illustrated and described.

In the accompanying drawings:

Figure 1 shows in elevation, with parts in section, one form of the spray head of the present invention;

Fig. 2 shows in elevation a modified form of spray head;

Fig. 3 shows, somewhat diagrammatically, the application of the spray head of the present invention for spraying purposes;

Fig. 4 is a detail showing in central section one of the forms of spray head of the present invention;

Fig. 5 is a similar detail showing a modified form of the invention, this form being the same as, or similar to, that of Fig. 1;

Fig. 6 is a similar detail showing a further modification;

Fig. 7 is a central section of a conical spray head embodying the invention;

Fig. 8 shows a conical spray head similar to that of Fig. 7 used in an upright position;

Fig. 9 shows a further modification of the invention;

Fig. 10 is a view taken at right angles to that of Fig. 9;

Fig. 11 is a still further modification of the invention;

Figure 17:
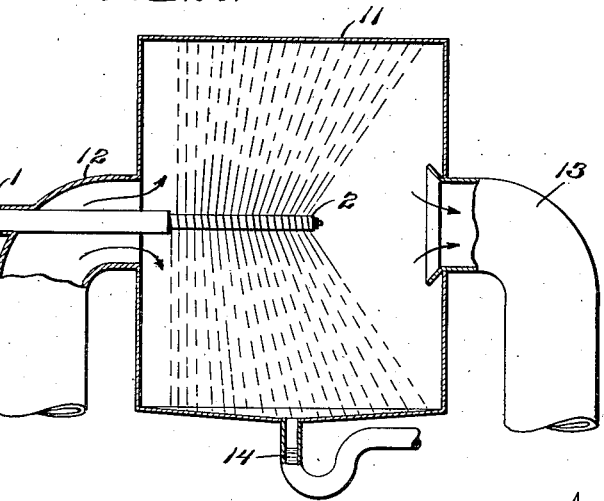
Figure 18:
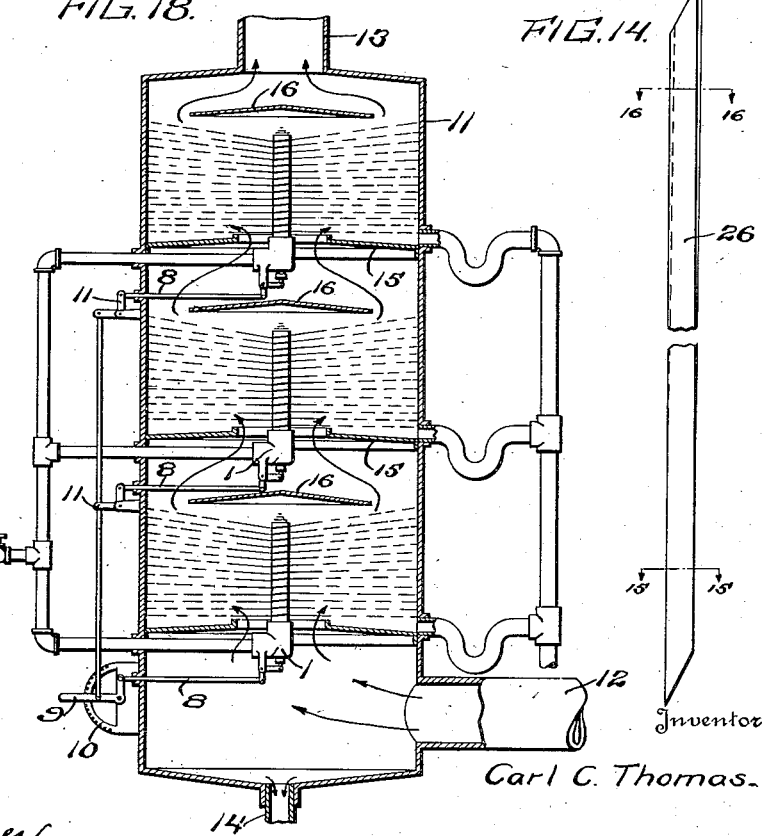
Figure 14:
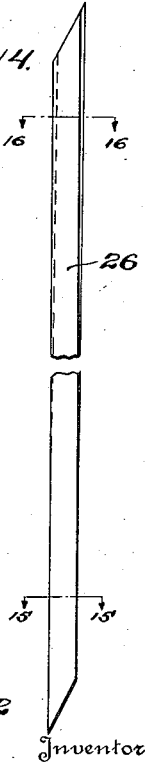
Fig. 14 shows a modified form of helical strip before being formed into a helix, this form being similar to that illustrated in Fig. 1.

Figs. 15 and 16 are sections taken respectively on the lines 15—15 and 16—16 of Fig. 14;

Fig. 17 shows a gas treating chamber or apparatus embodying the invention;

Fig. 18 shows a further form of gas treating apparatus embodying the invention;

Fig. 19 shows a still further modification such as may be used for a steam condenser;

Fig. 20 shows the invention embodied in a gas producer or carburizer; and

Fig. 21 shows a still further modified form of gas treating apparatus.

In the accompanying drawings similar parts are indicated in different figures by similar numerals with different suffixes appended thereto.

Figure 12:
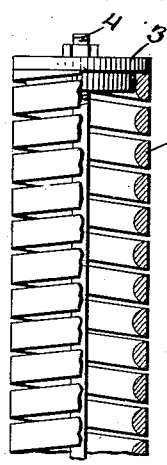
Fig. 12 shows a still further modification, partly in elevation, and partly in central vertical section.
Figure 13:
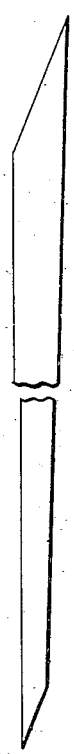
Fig. 13 shows a metal ribbon or strip from which the helical head of Fig. 2 can be constructed.

In describing the apparatus of the present invention, and the process which is practised therewith, it will be understood that the illustrations of the accompanying drawings are more or less diagrammatic and schematic, and that in actual practice many different variations and modifications thereof will be made. The invention will however be illustrated by these specific embodiments, and will be described more in detail in connection therewith. The novel spray head of the present invention is made up of a suitable base 1 provided with water or other liquid inlet connection and carrying the tubular spray or distributing member 2, which member may be cylindrical, or conical, in contour, as illustrated in the various figures of the drawings. This spray member 2 is advantageously made of a strip or ribbon of sheet metal, wound into a cylindrical or conical form, but in some cases it may be made by turning a helical slot in a tubular member, throughout a part or the whole of the length of such member. In other cases it may be cast in helical form, or machined, or otherwise constructed. This spray member 2 is provided at its outer end with a cap or closure 3 and in the embodiments of the invention illustrated a central bolt or rod 4, provided with a nut 5, connects said closure with the base of the spray head. As shown in Fig. 1 the tubular spray member may be seated in a socket in the base a sufficient distance to give it bearing. Connected to the rod 4 in the modifications of several of the figures is a bell crank lever 6 pivoted to an arm 7 projecting from the base and connected to an operating rod 8, by means of which the spray head can be adjusted and regulated. In the embodiments of the invention illustrated, the resilient helical spray member is normally extended and is intended to be compressed by the operation of the rod 8 between the closure 3 and the base 1. It will be seen that the spray member 2 is in the form of a helix, and that there is provided between the turns of the helix a slot, the width of which can be regulated and adjusted by means of the operating rod 8 and the distributing member extended and contracted to regulate the discharge therefrom. By reference more particularly to Figs. 4 to 7 and 12 to 16, it will be seen that the helical slot in the tubular spray member terminates in abrupt outer edges. Thus in the structure shown in Fig. 4 the slot 20 is of uniform width, and the turns of the helix are uniformly spaced apart. In the modification of Fig. 5, the pitch of the slot 21 is uniform, but the inclination of the slot varies gradually increasing toward the upper end in order that the spray therefrom may be given a greater inclination near the upper or outer end of the spray head. The metal strip from which the modification of Fig. 5 can be constructed is illustrated in Figs. 14 to 16, the taper or variation in the edge of the strip being formed by planing or by machining, or in any suitable manner. In the modification of Fig. 6 the slot 22 is rounded on the inside; while in the modification of Fig. 12 the helical member is made of half-round wire or ribbon with the rounded edge inside and the outer edge terminating in an abrupt corner or angle. It will be seen that in all these various modifications the helical slot has an abrupt outer edge. I am aware that spiral wire springs of round wire have been proposed for filtering water, and for various other purposes, but with such springs the spiral orifice presented has rounded outer edges which result in capillary attraction upon the escaping liquid, and the effect of which is to increase the surface tension of the escaping liquid and to break up this liquid as it emerges, thereby preventing effective film formation. Nevertheless I have discovered that when spray heads are provided with an abrupt outer edge such as illustrated on the accompanying drawing, such capillary attraction and surface tension effects are minimized or avoided, and a smooth and continuous film can be readily produced. I am also aware that spray heads have been proposed having a large number of small independent orifices therein, but with such spray heads the liquid is broken up before it emerges, and it can only emerge in small and independent jets; while with the novel spray head of the present invention a continuous helical film can be readily obtained, the thickness of which film can be readily regulated as desired. As a result, the friction of the emerging spray is minimized and the helical film leaves the spray head in a smooth and continuous manner. The continuous film will in practice usually extend some distance beyond the actual discharge edge of the helical slot, since it escapes from the outer abrupt edges of such slot without being broken up by surface tension or capillary attraction. Such film will of course decrease in thickness as its distance from the spray head increases, and it will then be broken up into a spray. By means of the regulating devices illustrated it is possible to increase or decrease the width of this film by compressing or expanding the helical spray member. It will be understood that different widths of slot will be more advantageous with different sizes of spray head and different water pressures. As a liquid, such as water, enters the bottom of the spray head such as illustrated in Figs. 1 and 2, discharge will immediately begin at the bottom of the helical slot, and the pressure will begin to be decreased or relieved at the bottom so that there will be a less pressure, or a relatively less pressure, at the top of the spray head. In some cases it is advantageous to provide means for overcoming this difference in pressure. Thus in the structure of Fig. 1 the slot is inclined more toward the top of the spray head so that the water will leave the spray head at a greater angle and a more uniform distribution will be effected. With a wider slot, the spray head will spray water over a less area than with a narrower slot, the pressure being the same. Accordingly, by decreasing the width of the slot, the effective area covered by the spray can be correspondingly increased until the maximum area is covered. The operation of the spray head of Fig. 1 is illustrated somewhat diagrammatically in Fig. 3, this spray head being used as a fountain or for watering lawns or other purposes. An area of fifty or sixty feet in diameter can be readily sprayed by the spray head of the present invention, with a water pressure of about twenty-five to thirty pounds. In the modification of Fig. 2 the helical slot is given a greater pitch toward the top of the spray head in order to make up for the difference in pressure of the water or other liquid. A metal ribbon or strip for producing such a spray head is illustrated in Fig. 13, the ends of this strip being cut off before the spray head is formed. In practice it will be understood that when metal ribbon is rolled into the form of a helix, the length of the helix can be varied and the helix can be cut off at any desired point. The tubular spray head $2^d$ of Figs. 7 and 8 is conical in form but in operation it is similar to that of Figs. 1 to 6. By means of such a conical spray head the helical film can be directed downwardly, as in Fig. 7, or upwardly as in Fig. 8, and the helical slot may have the same inclination throughout, as in Fig. 7, or may be arranged to give a diverging spray, as in Fig. 8. In order that there may be a further discharge at the end of the conical spray head, the closure $3^d$ is spaced apart from the conical member $2^d$ by means of lugs 23. In Figs. 9 to 11 the operation of the rod $4^e$ is effected by means of a cam member $6^e$, which cam member may have different forms, and which may operate from either the top or bottom of the spray head. This cam member is shown as pivoted to either the upper end of the rod $4^e$ (Fig. 11) or to the lower end (Figs. 9 and 10), and as bearing against the base $1^e$. The cam member $6^e$ is connected to the operating rod $8^e$ by means of which it is operated, and by means of which the helical member 2 can be contracted or permitted to expand. The modification of Fig. 12 is similar to that of Figs. 1 to 10 in that the helical slot is provided with an abrupt outer edge or edges so that the helical film emerges as a smooth continuous film without being broken up by capillary action or surface tension. In some cases however it is more advantageous to form the helical spray member of sheet metal of uniform thickness and to provide therein a slot of substantially uniform width. The arrangement of the operating bell crank lever of Figs. 1 to 8 or of the cam member of Figs. 9 to 11 is such that when moved in one direction the helical member will be contracted and the width of the slot will be decreased, the width of the slot being thus regulable as desired; and when moved in the other direction the helical member will be permitted to expand and the slot thereby increased. Upon further movement in the same direction the pressure of the closure 3 upon the tubular spray head will be entirely relieved so that this closure can be moved away from the helical member a sufficient distance to permit flushing of the spray head. It frequently happens that spray heads become clogged and hence inoperative and require to be freed from the obstruction. Upon releasing the helical member from its compressed condition, the helical slot will be opened and obstruction will tend to escape. When the closure 3 is moved away from the helical member, or is freed so that it can be so moved away by the water pressure, a free opening for the water is permitted. Thus in the structure of Figs. 1 and 12, with the closure 3 threaded upon the rod 4, as shown, the upward movement of the rod 4 by the operating rod 8 acting through the bell crank lever raises the closure 3 away from the tubular member thus permitting free escape between the upper end of this member and the closure 3, in a manner which will be readily understood. The obstructions within the spray head are thus flushed out, while by the expanding of the tubular member and the opening up of the helical slot, any such obstructions which may have become wedged in the slot are loosened and the flushing action thereby facilitated. Accordingly it will be seen that the novel spray head of the present invention is one which can be readily adjusted, even from a distance, and which can also be readily flushed, also from a distance, the entire control being effected by a single operating rod from any suitable or convenient location. It will be understood that the rod 8 will be provided with suitable means for regulating its adjustment and for holding it in adjusted position, suitable means being illustrated in connection with Figs. 17 to 21.

Figs. 17 to 21 show different embodiments of the invention as applied to the treatment of gases. The apparatus for such treatment, as illustrated, comprises a suitable chamber 11 of any suitable or preferred construction provided with a suitable gas inlet 12 and gas out-let 13; while in the structure of Figs. 17, 18 and 21 a water or other liquid outlet 14 is also shown. In the apparatus of Fig. 17 the air or other gas to be washed or purified or cooled or otherwise treated is introduced through the inlet pipe 12 with respect to which the spray head $2^g$ is concentrically arranged. The operating rod $4^g$, by means of which the spray head, and the helical slot therein, are adjusted, and the end closure removed for flushing, is operated by the operating handle 9 acting upon the quadrant 10. With the arrangement of Fig. 17 the gas enters concentrically with respect to the water sprayed, and is deflected outwardly thereby and intimately mixed therewith. By properly adjusting the spray head and the width of the helical slot therein it is possible to break up the water or other liquid in an exceedingly fine condition so that a most intimate and uniform distribution of the liquid is effected and a most intimate and thorough intermingling and treatment of the gases with the liquid is obtained. The purified or washed gas escapes through the gas outlet 13, this outlet being shown as provided with an apron extension within the chamber to prevent outflow of liquid therethrough. In Fig. 18 a further gas treating or washing apparatus is shown. It is common practice in gas washing apparatus to provide a series of sprays by centrifugal means, such centrifugal means being used in order to obtain the fine breaking up of the liquid and the intermingling of the liquid and gas. The novel apparatus of the present invention enables such intimate intermingling to be effected in a particularly advantageous manner. In the apparatus illustrated diagrammatically in Fig. 18 the gas enters at the bottom and passes up through the central opening in the lower partition 15, with respect to which the spray head is concentrically arranged. The gas then passes around the baffle 16 and up through another partition 15 where the treatment is repeated, a series of treatments being thus obtained. From each of the partitions a liquid overflow pipe is provided. The operating rods $8^h$ are all connected by bell crank levers 11 to a common operating handle $9^h$ by means of which all of the nozzles can be simultaneously operated and controlled as desired. In Fig. 19, the invention is illustrated as embodied in a condenser, the condenser casing indicated diagrammatically at $11^i$ being provided with steam or vapor inlet $12^i$ and liquid outlet $13^i$. The intimate breaking up of the liquid and the intimate intermingling of the liquid and steam causes a quick and thorough condensation to be effected. In this case also, as well as in the other forms of apparatus, the operating rod $8^i$ extends outside the casing so that the regulation of the spray head and the flushing of this spray head when desired can be effected from the outside. In Fig. 20 the invention is illustrated as embodied in a gas producer or gas carbureter, the casing of which is illustrated at $11^k$. The spray head $2^k$ is of conical form so that a generally downward spray is obtained. This spray head is carried by the pipe 17, and can be raised into its elevated position by means of the handle 18. Thus in water gas producers where an oil spray is desired for carbureting only during the production of the water gas, the spray head can be lowered into place for use, and raised away from the intense heat of the producer when not in use. In Fig. 21 a series of sprays are provided for within the same chamber, so that the air or gas flowing through this chamber will be subjected to a plurality of sheets of spray produced by the helical spray head. The arrangement of the gas and liquid connections of this figure is similar to that already described. In the operation of these various forms of apparatus, the rate of flow of the air or gas to be treated can be regulated as desired, and the spray head can also be regulated as desired. The spray head may advantageously be such as to give a diverging spray such as will substantially fill the entire chamber of the apparatus. A single spray head may in some cases be sufficient to effect complete purification or treatment of the gas, and this spray head may be of cylindrical or conical form as may be found most advantageous. In other cases, a series of spray heads can be advantageously used, and the gases given a series of treatments successively. In the operation of the novel spray head of the present invention the liquid will be sprayed in the form of a continuous helical film which will leave the spray head without being broken up, and which will subsequently be broken up into a spray. The fineness of this spray can be regulated by regulating the spray head, and a fineness of subdivision approximating mist or steam can be readily obtained. It will be seen that by the process of the present invention the water is sprayed in a particularly advantageous manner, and that in the treatment of gases by means of such spray, the treatment will be effected in a similar advantageous manner. From the foregoing description, taken in connection with the drawing, it will be seen that the invention is capable of general application for the spraying of liquids and the treating of gases, and that the invention may take many different forms in actual practice. Accordingly it is intended and understood that the invention is illustrated by, but is not limited to, the embodiments thereof so illustrated and described, and that variations and modifications can be made therein without departing from the spirit and scope of the invention.

I claim,

1. An apparatus for spraying liquids comprising a spray head having therein a helical slot with abrupt discharge edges, whereby the liquid can be discharged in the form of a helical film.

2. An apparatus for spraying liquids comprising a spray head of resilient material having therein a helical slot with abrupt discharge edges, and means for varying the width of the slot therein, whereby the liquid can be discharged in the form of helical films of variable thickness.

3. An apparatus for spraying liquids comprising a spray head of resilient material having therein a helical slot with abrupt discharge edges, a closure for one end of said spray head, and means for opening said closed end and flushing the spray head when desired.

4. An apparatus for spraying liquids comprising a spray head made up of a helical strip of resilient material having abrupt outer edges, the turns of said helix being normally spaced apart to form a helical slot with abrupt outer edges, and means for compressing said spray head to vary the width of the slot therein.

5. An apparatus for spraying liquids comprising a spray head made up of a helical strip of resilient material having abrupt outer edges, the turns of said helix being normally spaced apart to form a helical slot with abrupt outer edges, a closure for one end of said spray head, and means coacting with said closure for compressing said spray head to vary the width of the slot therein, said closure being movable away from said head for flushing the spray head when desired.

6. An apparatus for spraying liquids comprising a spray head made up of a helical strip of resilient material having abrupt outer edges, the turns of said helix being normally spaced apart to form a helical slot with abrupt outer edges, a closure for one end of said spray head, means coacting with said closure for compressing said spray head to vary the width of the slot therein, and means for moving said closure away from said helical strip to permit flushing of the spray head when desired.

7. An apparatus for spraying liquids comprising a spray head of resilient material having therein a helical slot with abrupt discharge edges, said slot varying in inclination in different parts of the spray head, whereby the liquid can be discharged in the form of a helical film in different directions from different parts of the spray head.

8. An apparatus for spraying liquids comprising a spray head of resilient material having therein a helical slot with abrupt discharge edges, the pitch of said slot varying in different parts of the spray head whereby the liquid can be discharged in the form of a helical film with different distances between the turns of the helix in different parts of the spray head.

9. An apparatus for spraying liquids comprising a spray head of resilient material having therein a helical slot with abrupt discharge edges, said slot varying in inclination gradually from one end to the other, whereby the liquid can be discharged in the form of a helical film varying in direction from one end to the other of the spray head.

10. An apparatus for spraying liquids comprising a spray head of resilient material having therein a helical slot with abrupt discharge edges, the pitch of said slot increasing gradually from one end to the other, whereby the liquid can be discharged in the form of a helical film with gradually increasing distances between the turns of the helix in different parts of the spray head.

11. An apparatus for spraying liquids comprising a spray head made up of a helical strip of resilient material of gradually increasing width having abrupt outer edges, the turns of said helix being normally spaced apart to form a helical slot of gradually increasing pitch and with abrupt outer edges, and means for compressing said spray head to vary the width of the slot therein.

12. An apparatus for spraying liquids comprising a spray head made up of a helical strip of resilient material having abrupt outer edges which vary in inclination from one end to the other, the turns of said helix being normally spaced apart to form a helical slot with abrupt outer edges and of gradually increasing inclination from one end of the head to the other, and means for compressing said spray head to vary the width of the slot therein.

13. An apparatus for spraying liquids comprising a spray head made up of a base provided with a liquid inlet, a helical member of resilient material having abrupt outer edges mounted upon said base, the turns of said helical member being normally spaced apart to form a helical slot with abrupt outer edges, a closure for the other end of said helical member, a rod connecting said closure and base, and means operatively connected with said rod for compressing said helical member to vary the width of the slot therein.

14. An apparatus for spraying liquids comprising a flushable spray head made up of a base provided with a liquid inlet, a helical member of resilient material having abrupt outer edges mounted upon said base, the turns of said helical member being normally spaced apart to form a helical slot with abrupt outer edges, a closure for the other end of said helical member, a rod connecting said closure and base, and means operatively connected with said rod for compressing said helical member to vary the width of the slot therein, and for moving said closure away from said member to permit flushing of the spray head when desired.

15. An apparatus for spraying liquids comprising a plurality of spray heads of resilient materials each having therein a helical slot with abrupt discharge edges, and means for varying the width of the slots in said spray heads simultaneously.

16. An apparatus for spraying liquids comprising a plurality of spray heads, each made up of a helical strip of resilient material having abrupt outer edges, the turns of said helix being normally spaced apart to form a helical slot with abrupt outer edges, closures at the ends of each of said spray heads, and means coacting with said closures for compressing said spray heads simultaneously to vary the width of the slots therein.

17. An apparatus for spraying liquids comprising a plurality of spray heads, each made up of a helical strip of resilient material having abrupt outer edges, the turns of said helix being normally spaced apart to form a helical slot with abrupt outer edges, closures at the ends of each of said spray heads, and means coacting with said closures for compressing said spray heads simultaneously to vary the width of the slots therein, and for moving said closures simultaneously away from said helical strips to permit flushing of the spray heads when desired.

18. An apparatus for spraying liquids comprising a plurality of spray heads, each made up of a base provided with a liquid inlet, a helical member of resilient material having abrupt outer edges mounted upon said base, the turns of said helical member being normally spaced apart to form a helical slot with abrupt outer edges, a closure for the other end of said helical member, a rod connecting said closure and base, and means operatively connected with said rods for compressing said helical members simultaneously to vary the width of the slot therein.

19. An apparatus for spraying liquids comprising a series of flushable spray heads, each made up of a base provided with a liquid inlet, a helical member of resilient material having abrupt outer edges mounted upon said base, the turns of said helical member being normally spaced apart to form a helical slot with abrupt outer edges, a closure for the other end of said helical member, and a rod connecting said closure and base, and means operatively connected with said rods for compressing said helical members simultaneously to vary the width of the slots therein, and for moving said closures simultaneously away from said member to permit flushing of the spray heads when desired.

20. An apparatus for spraying liquids comprising a plurality of tubular spray heads arranged in alinement axially with each other, each of said spray heads made up of a helical strip of resilient material having abrupt outer edges, the turns of said helix being normally spaced apart to form a helical slot with abrupt outer edges, and means for compressing said spray heads simultaneously to vary the width of the slots therein.

21. An apparatus for spraying liquids and treating gases comprising a gas treating chamber provided with gas inlet and outlet, and a spray head within said chamber having therein a helical slot with abrupt discharge edges, and arranged to discharge a helical film and spray into the gases flowing through said chamber.

22. An apparatus for spraying liquids and treating gases comprising a gas treating chamber provided with gas inlet and outlet, a spray head of resilient material within said chamber having therein a helical slot with abrupt discharge edges, and arranged to discharge a helical film and spray into the gases flowing through said chamber, and means for adjusting said spray head and varying the width of the slot therein from outside said chamber.

23. An apparatus for spraying liquids and treating gases comprising a gas treating chamber provided with gas inlet and outlet, a spray head of resilient material within said chamber having therein a helical slot with abrupt discharge edges, and arranged to discharge a helical film and spray into the gases flowing through said chamber, a closure for said spray head, and means extending outside said chamber for adjusting said spray head and for varying the width of the slot therein and for moving said closure away from said spray head to permit flushing of the spray head when desired.

24. An apparatus for spraying liquids and treating gases comprising a gas treating chamber provided with gas inlet and outlet, a spray head of resilient material arranged axially in alinement with said inlet and outlet within said chamber having therein a helical slot with abrupt discharge edges, and arranged to discharge a helical film and spray into the gases flowing through said chamber, and means for adjusting said spray head and varying the width of the slot therein from outside said chamber.

25. An apparatus for spraying liquids and treating gases comprising a gas treating chamber provided with gas inlet and outlet, a spray head of resilient material within said chamber having therein a helical slot with abrupt discharge edges, said slot varying in inclination from one end to the other, said spray head being arranged to discharge a helical film and spray varying in direction from one end to the other into the gases flowing through said chamber, and means for adjusting spray head and varying the width of the slot therein from outside said chamber.

26. An apparatus for spraying liquids and treating gases comprising a gas treating chamber provided with gas inlet and outlet, and a tubular spray head arranged axially in alinement with said gas inlet within the chamber having therein a helical slot with abrupt discharge edges, and arranged to discharge a helical film and spray in a substantial radial direction into the gases flowing through said chamber.

27. An apparatus for spraying liquids and treating gases comprising a gas treating chamber provided with gas inlet and outlet, and a plurality of tubular spray heads arranged in alinement within said chamber, each of said spray heads being of resilient material and having therein helical slots with abrupt discharge edges, said spray heads being arranged to discharge a series of helical films and sprays in succession into the gases flowing through said chamber.

28. An apparatus for spraying liquids and treating gases comprising a gas treating chamber provided with gas inlet and outlet, and a plurality of tubular spray heads arranged in alinement within said chamber, each of said spray heads being of resilient material and having therein helical slots with abrupt discharge edges, said spray heads being arranged to discharge a series of helical films and sprays in succession into the gases flowing through said chamber, and means extending outside said chamber for varying the width of the slots in said spray heads.

29. An apparatus for spraying liquids and treating gases comprising a gas treating chamber provided with gas inlet and outlet, a plurality of tubular spray heads arranged in alinement within said chamber, each of said spray heads being of resilient material and having therein helical slots with abrupt discharge edges, said spray heads being arranged to discharge a series of helical films and sprays in succession into the gases flowing through said chamber, a closure at one end of each of said spray heads, and means extending outside the chamber for moving one or more of said closures away from said spray heads to permit flushing of the same when desired.

30. An apparatus for spraying liquids and treating gases comprising a gas treating chamber provided with gas inlet and outlet, a plurality of tubular spray heads arranged in alinement within said chamber, each of said spray heads being of resilient material and having therein helical slots with abrupt discharge edges, said spray heads being arranged to discharge a series of helical films and sprays in succession into the gases flowing through said chamber, a closure at one end of each of said spray heads, and means extending outside the chamber for moving one or more of said closures away from said spray heads to permit flushing of the same when desired, and for varying the widths of one or more of the slots in said spray heads.

31. The process of spraying liquids which comprises ejecting the same in a general radial direction through a helical slot having abrupt discharge edges and regulating the pressure of the liquid and the width of the slot to cause the liquid to be ejected in the form of a thin helical film, whereby such continuous helical film is broken up and atomized into a fine spray.

32. The process of spraying liquids which comprises ejecting the same horizontally in a general radial direction through a helical slot of variable width having abrupt discharge edges, and regulating the width of such slot to cause the turns of the film to break into spray before the adjacent turns of the helix contact with each other.

33. The process of spraying liquids and treating gases which comprises ejecting the liquid into a current of gas in the form of a thin helical film at an angle to the direction of flow of the gas and regulating the pressure of the liquid and the thickness of the film to cause the film to be broken up and atomized into a fine spray in contact with the gas.

34. The regulable process of spraying liquids and treating gases which comprises ejecting the liquid into a current of gas in the form of a regulable helical film, and regulating such film to cause the breaking up thereof into a fine spray in contact with the gas.

35. A spraying device comprising a unitary tubular member provided in its walls with a slot the direction of which, through the walls of the tube, is oblique to the axis of the tube, said member being extensible and contractible axially, whereby the width of said slot may be varied, and being closed at one end and having a flow connection.

36. A spraying device comprising a unitary tubular member provided in its walls with a slot the direction of which, through the walls of the tube, is oblique to the axis of the tube, said member being extensible and contractible axially, whereby the width of said slot may be varied, and being closed at one end and having a flow connection, and means for contracting said tube and for regulating extension thereof.

37. A spraying device comprising a tubular member closed at one end and having a flow connection, and provided in its walls with slots the direction of which, through the walls of the tube, is oblique to the axis of the tube, different portions of the tube having slots of different inclination, said member being extensible and contractible axially, whereby the width of said slots may be varied.

38. A spraying device comprising a hollow unitary distributing member adapted to be extended and contracted to regulate the discharge therefrom, a flow connection therefor, and means for extending and contracting said distributing member comprising means located in part within said distributing member and extending through a bearing to the exterior of the spraying device and movable axially with respect to said spraying device, and means for so moving it.

39. A spraying device comprising a hollow distributing member adapted to be extended and contracted to regulate the discharge therefrom, a flow connection for said distributing member connected to one end thereof, an end closure for said distributing member, and means for regulating the distention of said distributing member comprising a sliding member connected to said end closure and passing through a bearing in said flow connection, and means connected to said sliding member at a point outside of said flow connection, for moving said sliding member axially.

40. A spraying device comprising a hollow distributing member adapted to be extended and contracted to regulate the discharge therefrom, a flow connection therefor, connected to one end thereof, operating means within said distributing member and extending to the outside thereof, for effecting extension and contraction of said distributing member, and means connected to said flow connection and engaging said operating means for operating the same.

41. A spraying device comprising a hollow distributing member adapted to be extended and contracted to regulate discharge therefrom, a flow connection therefor, operating means within said distributing member and extending to the outside thereof, for effecting extension and contraction of said distributing member, and a lever pivoted to said flow connection and engaging the said operating means for operating the same.

42. A spraying device comprising a tubular member adapted to be extended and contracted to regulate the discharge therefrom, a flow connection for said distributing member, a combined end closure and valve for said distributing member, and means for moving said end closure and valve axially to extend or contract said distributing member, such means arranged to at will free said closure and valve from the end of said distributing member thereby opening the end of said distributing member for free flow.

43. A spraying device comprising a hollow distributing member adapted to be extended and contracted to regulate the discharge therefrom, a flow connection therefor, a plug forming a combined end closure and valve for said distributing member, such plug engaging the end of said distributing member, but separable therefrom, and operating means for said plug arranged to move such plug through a predetermined range of extension and contraction of said distributing member, and also to move such plug out of engagement with the end of said distributing member, thereby opening the distributing member at the end for free flow.

In testimony whereof I affix my signature in the presence of two witnesses.

CARL C. THOMAS.

Witnesses:
ELIZABETH A. PARKER,
ROBERT T. TAYLOR.